Dec. 13, 1960      G. H. DIMOND      2,963,837
COMBINED FITMENT APPLYING AND CAPPING MACHINE
Filed Nov. 22, 1955      6 Sheets-Sheet 1

INVENTOR.
George H. Dimond
BY
Thomas E. Tate
Agent.

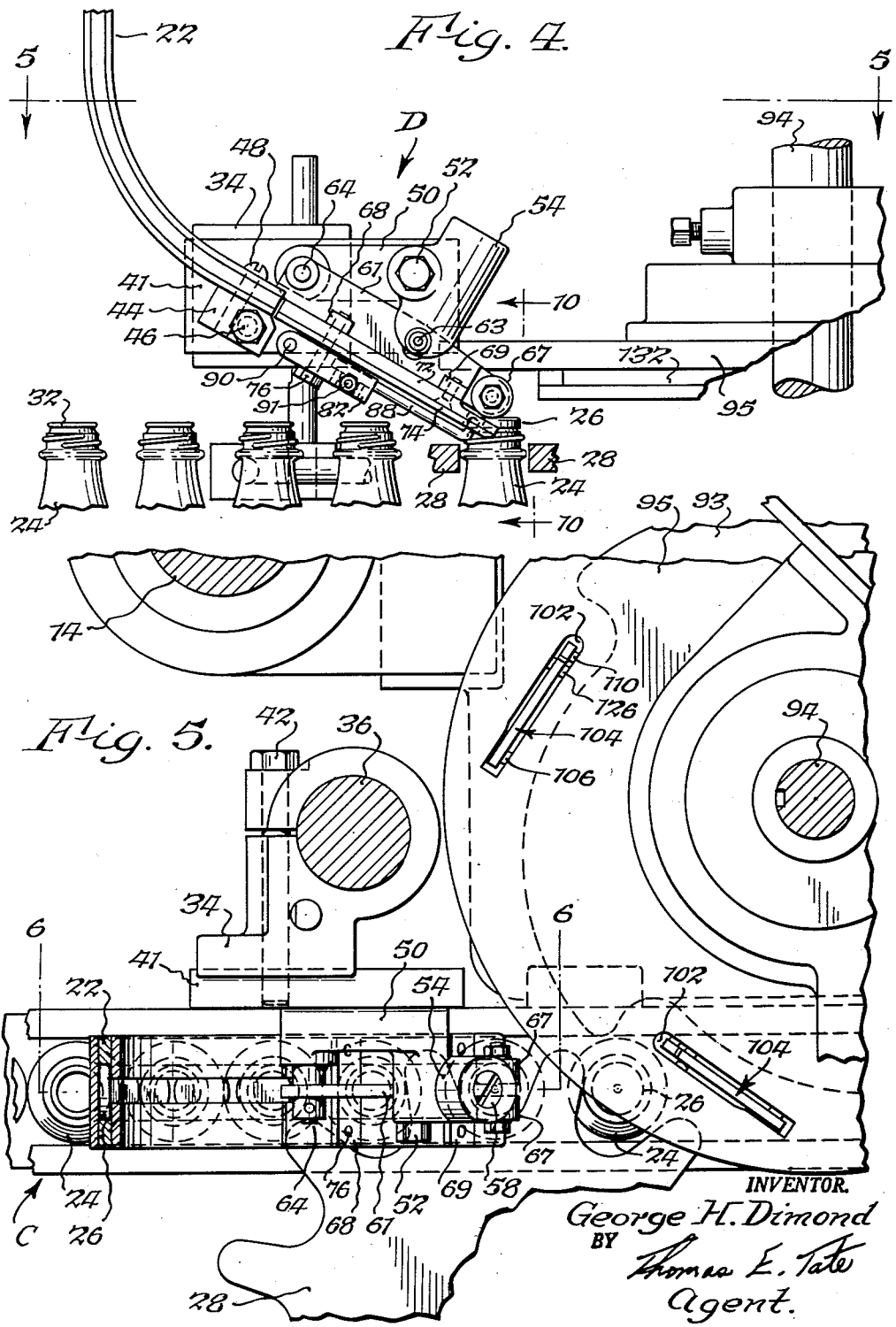

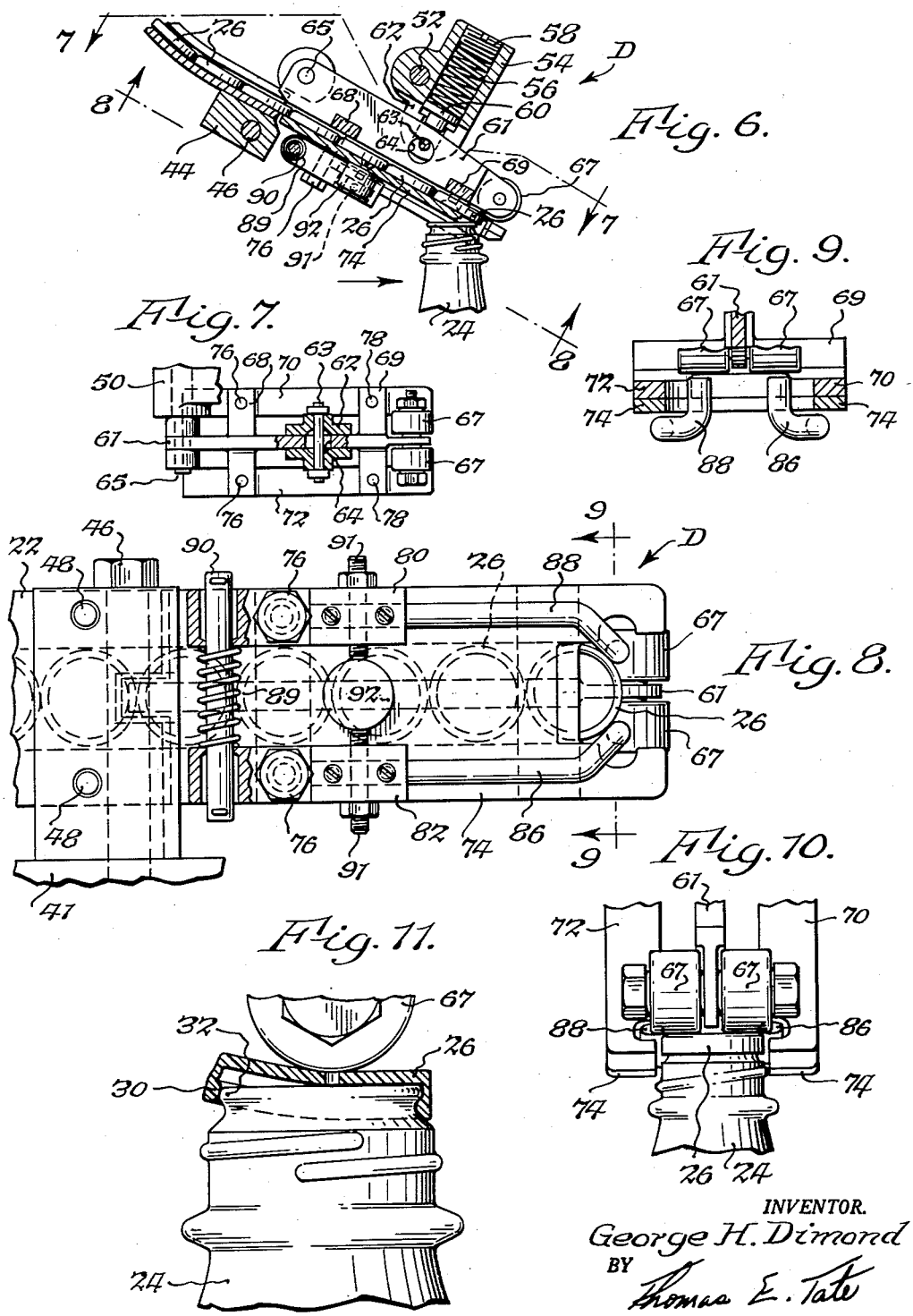

INVENTOR.
George H. Dimond
BY
Thomas E. Tate
Agent.

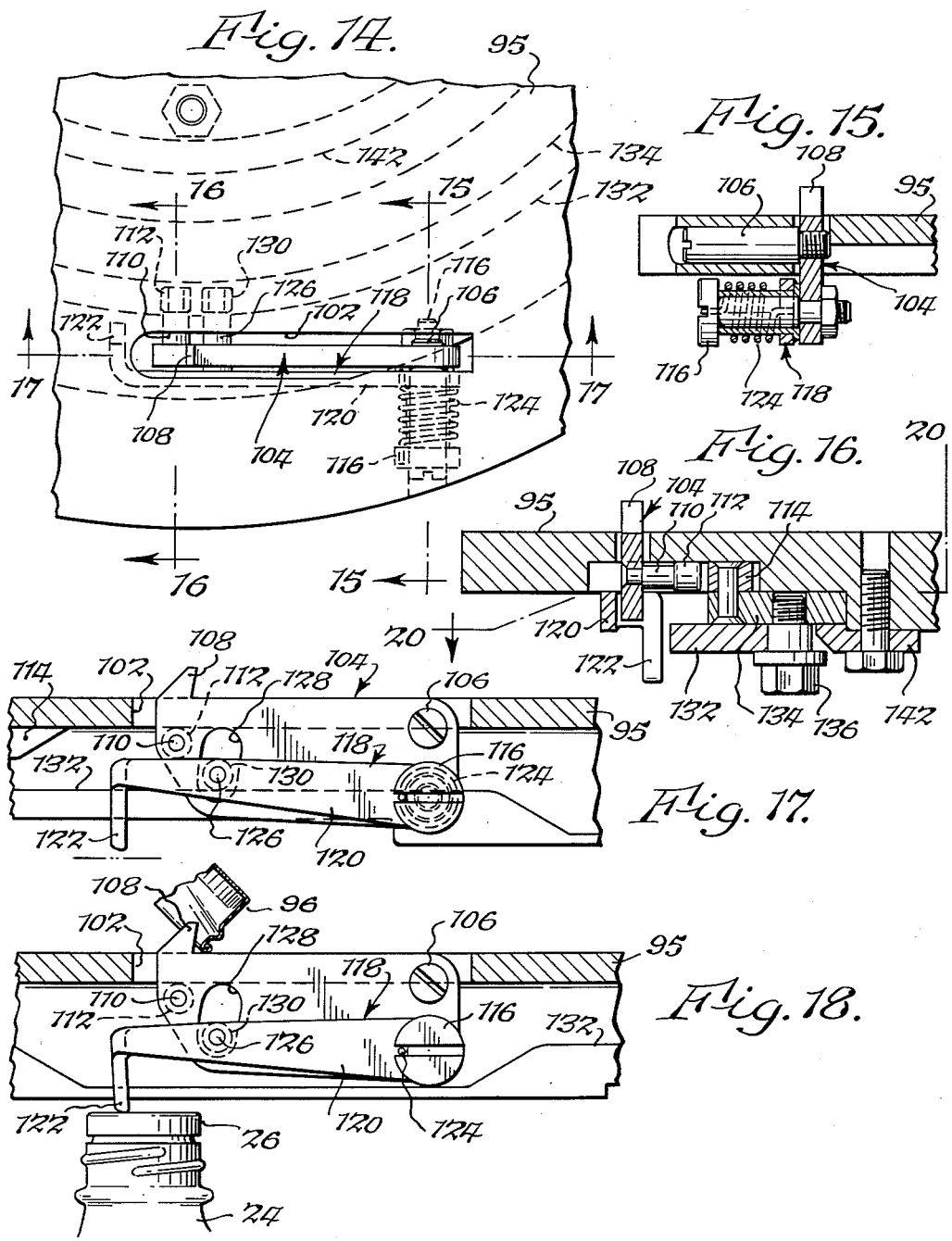

Dec. 13, 1960                G. H. DIMOND                2,963,837
COMBINED FITMENT APPLYING AND CAPPING MACHINE
Filed Nov. 22. 1955                                6 Sheets-Sheet 6
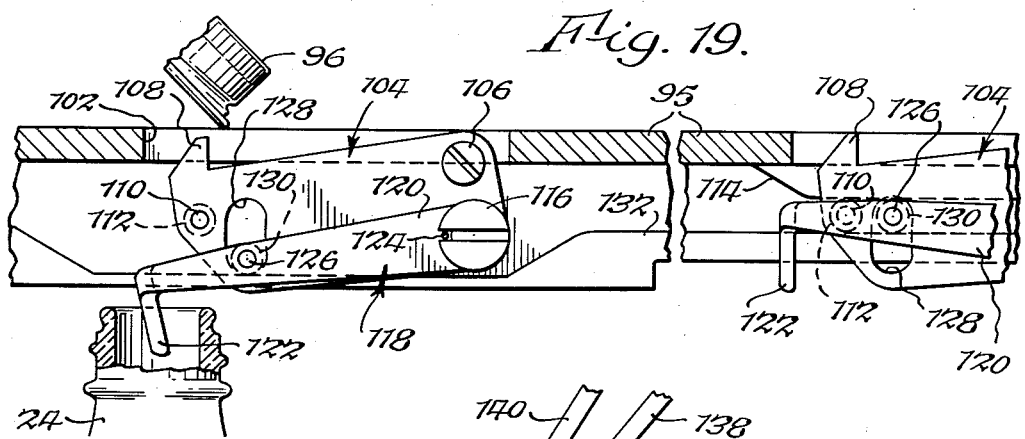
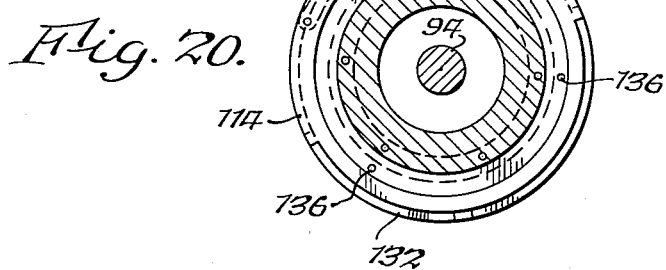
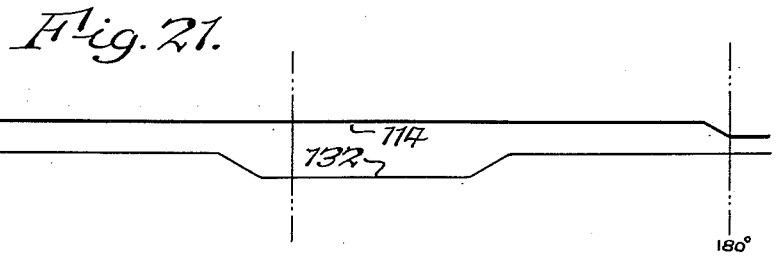
INVENTOR.
George H. Dimond
BY
Thomas E. Tate
Agent.

United States Patent Office 2,963,837
Patented Dec. 13, 1960

2,963,837

COMBINED FITMENT APPLYING AND CAPPING MACHINE

George H. Dimond, East Aurora, N.Y., assignor to Consolidated Packaging Machinery Corporation, Buffalo, N.Y., a corporation of New York Filed Nov. 22, 1955, Ser. No. 548,307

6 Claims. (Cl. 53—67)

This invention relates in general to combined fitment applying and capping machines, and particularly to a new and useful automatic machine which is adapted to continuously advance containers or bottles, first into operative association with means for placing a fitment onto each successively advanced bottle and then into operative association with means for placing a cap onto each bottle having a fitment thereon.

A machine constructed in accordance with this invention is an improvement over previous machines of this character, particularly in respect to a new and useful means for placing fitments onto the top of each bottle prior to the application of caps thereon, and to the incorporation of automatic means to prevent the application of a cap onto a bottle whenever for any reason no fitment has first been placed thereon.

Accordingly, it is an object of this invention to provide a combined fitment applying and capping machine.

Another object of this invention is to provide a combined fitment applying and capping machine having means for continuously advancing a series of bottles or containers into operative association with means for first applying a fitment onto the top of each bottle and additional means for applying a cap onto the top of the bottle over the fitment, and including means for preventing the application of a cap onto any bottle which does not already have a fitment thereon.

Another object of this invention is to provide a machine of the character stated having a simple, automatic device for preventing the feeding of caps in the event either that no bottle is approaching the capping means or no fitment is on a bottle which is approaching the capping means.

A further object of this invention is to provide a machine of the character stated having a new and useful fitment applying means.

A still further object is to provide a machine of the character stated which is simple in design, rugged in construction and economical to manufacture.

With these and other objects in view, the nature of which will be more apparent, the invention will be more fully understood by reference to the drawings, the accompanying detailed description and the appended claims.

In the drawings,

Fig. 4 is a fragmentary front elevation of the fitment applying means;

Fig. 5 is a horizontal section taken on the line 5—5 of Fig. 4;

Fig. 6 is a vertical section taken on the line 6—6 of Fig. 5;

Fig. 7 is a plan view, partly in section, taken on the line 7—7 of Fig. 6;

Fig. 8 is an enlarged bottom plan view, partly in section, taken on the line 8—8 of Fig. 6;

Fig. 9 is a transverse section taken on line 9—9 of Fig. 8;

Fig. 10 is an enlarged fragmentary end elevation of the forward portion of the cap applying means;

Fig. 11 is a fragmentary front elevation showing a fitment being applied to a bottle;

Fig. 14 is a fragmentary top plan view of the rotary cap transfer table;

Fig. 15 is a vertical section taken on the line 15—15 of Fig. 14;

Fig. 16 is a vertical section taken on the line 16—16 of Fig. 14;

Fig. 17 is a vertical section taken on the line 17—17 of Fig. 14 and showing the picker finger and detector approaching a bottle;

Fig. 18 is a view similar to Fig. 17 but showing the detector on a fitment and the picker finger about to engage a cap;

Fig. 19 is a view similar to Fig. 17 but showing the detector and picker finger in a down position when no fitment is on a bottle and the return of the detector to an upper position under the influence of the detector cam;

Fig. 20 is a horizontal section taken on the line 20—20 of Fig. 16 with certain of the parts omitted; and Fig. 21 is a development of the picker finger and detector cams for 180° of cam travel.

Figure 1:
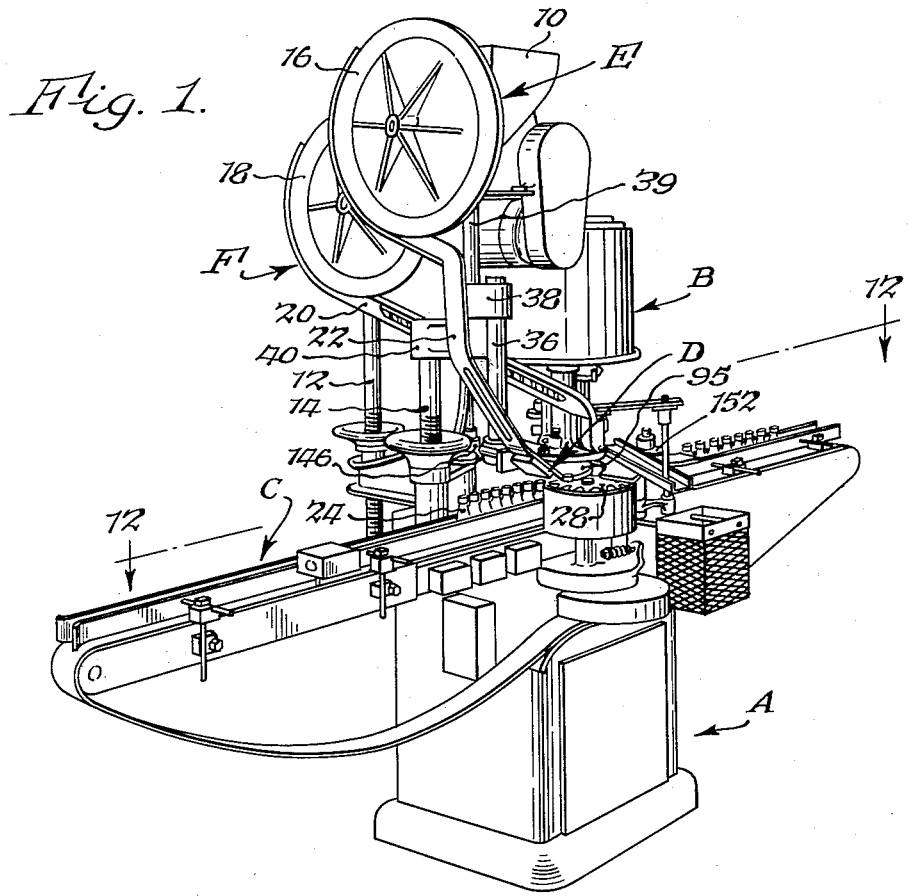
Fig. 1 is a somewhat schematic perspective view of a combined fitment applying and capping machine constructed in accordance with this invention.
Figure 2:
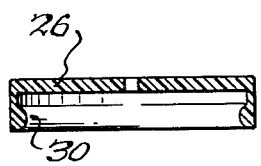
Fig. 2 is a transverse section of a fitment which is applied to the top of a bottle by the machine of Fig. 1.

Referring to the drawings in particular, the invention as illustrated is embodied in a continuously operating machine for sorting, feeding and placing fitments and caps onto successively presented bottles or containers.

In general the machine comprises a base A upon which the remaining mechanisms are mounted and which contains driving mechanism for operating a capping turret B and associated mechanisms. An intake and discharge conveyor C extends outwardly from both ends of the base A and is provided with guide rails and a moving belt conveyor to direct a series of containers or bottles first into operative engagement with successively presented fitments which are applied onto each bottle by a fitment applying mechanism D located beneath a fitment sorting and feeding mechanism E. The bottles are moved by the conveyor C to rotary means for moving the bottles into operative association with the capping turret B where the caps are placed onto each bottle which has a fitment thereon. Caps for the bottles are dumped into the top of a hopper (not shown) which is mounted over a cap sorting and feeding mechanism F, and fitments for the bottles are dumped into the top of the hopper 10 mounted over the fitment sorting and feeding mechanism E.

The cap sorting and feeding mechanism F and the fitment sorting and feeding mechanism E are held on vertical columns 12 and 14, respectively, which are adjustably positioned on the base A. The sorting and feeding mechanisms E and F are each provided with a rotary disc inside casings 16 and 18, respectively, which act in a known manner to agitate the caps and the fitments so that the caps become oriented in one direction and are fed into a chute 20, and the fitments become similarly oriented and are fed into a chute 22.

Figure 3:
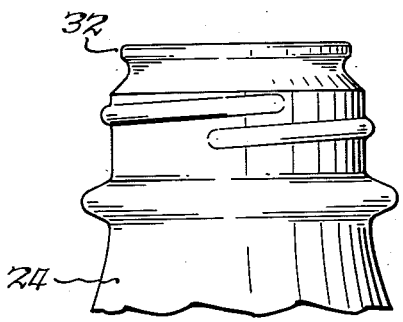
Fig. 3 is a fragmentary elevation of the upper end of a bottle onto which the fitment and a cap are applied.
Figure 12:
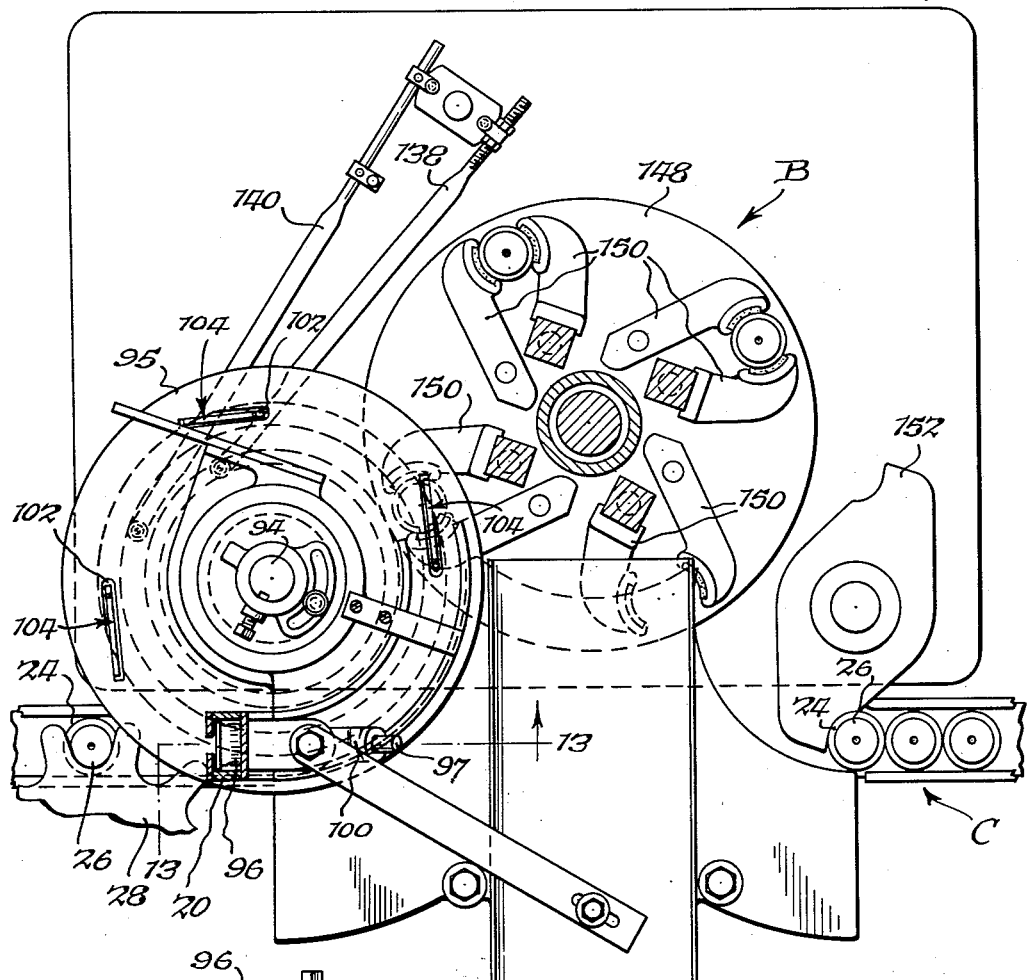
Fig. 12 is a fragmentary horizontal section taken on the line 12—12 of Fig. 1.
Figure 13:
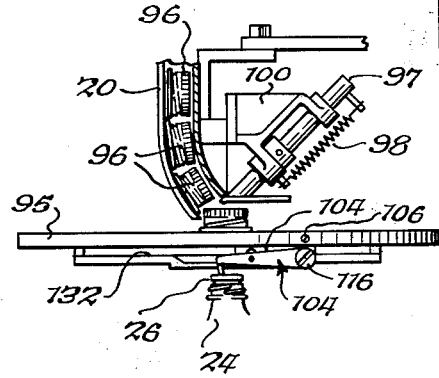
Fig. 13 is a vertical section taken on the line 13—13 of Fig. 12.

A series of bottles 24, the top of one of which is shown in detail in Fig. 3, is continuously moved by the intake and discharge conveyor C, first into operative association with the fitment applying mechanism D. The mechanism D is located at the bottom of the chute 22 and over the conveyor C. The chute 22 is normally supplied with fitments which are oriented with the opening or bottle engaging portion positioned downwardly.

A bottle spacing star wheel 28 having a plurality of bottle engaging pockets thereon is made to rotate with its outer periphery in the path of the conveyor C in timed relation with the turret B by mechanisms located in the base A and is effective to hold each successive bottle 24 within a respective pocket and to move it in a small arc over the conveyor C and beneath the fitment applying mechanism D, causing the top lip of the bottle to engage the bottom edge of a fitment 26 (see Fig. 6). The fitment applying mechanism D is effective to cause a fitment to become pressure seated upon the top of each bottle as it is moved thereunder by the star wheel 28. Each fitment 26 has an inner bottom lip 30 which is forced by pressure over a lip 32 on the top edge of the bottle 24.

The fitment applying mechanism D is held in position in alignment with the bottom end of the chute 22 by a collar bracket 34 fastened on the bottom end of a column 36 which in turn is held by a double-collared bracket 38, the other collar of which is secured about a column 39 fastened to a similar double-collared bracket 40. The other collar of the bracket 40 encompasses the column 14 and is fastened thereon by suitable means.

The collar bracket 34 has a rectangularly-shaped outer portion grooved to receive a rectangular block 41 which is secured therein by a bolt 42. A small rectangular block 44 is fastened to the block 41 by a bolt 46 and it supports the bottom end of the chute 22 which is connected thereto by bolts 48.

Also secured to the block 41 is a bracket 50 having an elongated forwardly projecting hub portion at one end and is secured thereto by means of a bolt 52. An integral spring-retaining cup 54 projects upwardly from the hub portion of the bracket 50. The cup 54 is provided with a compression spring 56 held inside the cup by a retaining screw 58. The spring 56 acts against a piston 60 located at the bottom end of the cup 54. The bottom of the piston 60 bears against the top central portion of an arm 61 which extends through a rectangular passage formed by lower extensions 62 of the sides of the cup 54. A limit-stop pin 63 is secured between the extensions 62 and extends through an aperture 64 in the arm 61. One end of the arm 61 is pivoted about a pin 65 affixed to the bracket 50 at the end thereof opposite the elongated hubbed portion. As shown in Fig. 6 of the drawings, the normal position of the arm 61 is such that it is at its maximum limit of clockwise pivoting as established by the pin 63, and can be pivoted a slight amount in a counter clockwise direction against the pressure of the spring 56 until stopped by the pin 63. The bottom end of the arm 61 is provided with pressure rollers 67.

Two spaced-apart parallel cross members 68 and 69 are fastened to the bottom of the arm 61 and they carry two parallel members 70 and 72 on their outer edges which are arranged in alignment with the chute 22 forming the upper part, or roof, of a passage for the fitments 26 as a continuation of the passage of the chute 22. A floor plate 74 coextensive with the members 70 and 72 is arranged in a spaced position below the members 70 and 72 and parallel thereto, forming the floor of the passage for the fitments. The floor plate 74 is held by a pair of pivot bolts 76 which extend upwardly through each of a pair of parallel spaced-apart block-shaped arms 80 and 82 to the cross member 68, and a similar pair of bolts 78 which extend upwardly from the floor plate 74 to the cross member 69. A small rectangular area in the front central portion of the floor area is cut away to permit the exit of fitments therefrom during the operation of the fitment applying mechanism D.

In order to prevent the fitments from sliding off the floor plate 74 beneath the rollers 67 a pair of detents 86 and 88 are provided. The detents 86 and 88 are held by the block-shaped arms 80 and 82, respectively, and extend outwardly therefrom in normal parallel alignment with the edges of the floor plate 74 and converge towards each other and extend upwardly under the rollers 67 and block the exit of the passage formed by the floor plate 74 and the arms 70 and 72. The detents 86 and 88 are urged together at the exit by a compression spring 89 which is positioned around a pin 90 which extends through the opposite end of the blocks 80 and 82. The blocks 80 and 82 are free to pivot about the bolts 76 so that the detents 86 and 88 may be moved outwardly against the action of the spring 89. A pair of set screws 91 are threaded through the sides of the blocks 80 and 82 on the detent side of the bolts 76 and abut against a centrally located stop 92 fastened to the floor plate 74. These screws are adjustable to limit the amount of convergence of the detents 86 and 88 caused by the urging of the spring 89.

The detents 86 and 88 prevent the escape of fitments except in cases when the top lip of a bottle being advanced by the star wheel 28 engages the lower edge of the lowermost fitment. When the bottle engages the forward edge of the fitment the force exerted is sufficient to separate the detents 86 and 88 and pull the fitment through them onto the top of the bottle. While this is taking place the rollers 67 exert an increasing pressure on the fitments as the pivot arm 61 and its related devices pivot about the pin 65 against the force of the spring 56 as the bottle is moved farther thereunder (see Figs. 6, 10 and 11).

The bottles 24 are moved beyond the fitment-applying mechanism D by the star wheel 28 into a pocket of a star wheel 93 which is affixed to a rotary shaft 94 upon which is also mounted a rotary cap-transfer table 95. Caps 96 in the chute 20 are oriented face downwardly so that the bottom lip of the bottom cap projects downwardly slightly above the table 95. The caps are held inside the chute by a plunger 97 which is biased downwardly into the chute exit passage by a tension spring 98 fastened to one end of the plunger 97 and fastened at its other end to a mounting bracket 100. The bottom face of the plunger 97 is normally horizontal and is arranged so as to project into the passage far enough to retain the caps in the chute unless they are stripped out, in which case the plunger will be moved upwardly by a cap against the force of the spring 98.

The cap transfer table 95 is provided with a plurality of openings 102 of generally rectangular shape in each of which is a generally rectangular picker finger 104. Each picker finger 104 is pivotally mounted at its one end on a pivot 106 affixed to the transfer table 95. The opposite end of the picker finger 104 is provided with a cap-engaging projecting portion 108 which on occasion extends above the top surface of the transfer table 95. Connected to the picker finger below the projection 108 is a stud 110 which extends outwardly at right angles therefrom and is provided with a roller follower 112 which rides on a cam surface outlined on a portion of the bottom of a ring cam 114 and a portion of the bottom of the transfer table 95.

Fastened at the lower corner of the picker finger 104 below the pivot 106 is a stud 116 which extends outwardly at right angles therefrom. Mounted on this stud 116 is a detector generally indicated at 118 which comprises a long arm 120 extending outwardly from the stud 116 and a shorter vertical arm 122 extending downwardly from the end of the arm 120. The detector 118 is urged downwardly relative to the picker finger 104 by a torsion spring 124 which is mounted around the stud 116 and has one end connected thereto and the other end connected to the arm 120. The detector 118 is also provided with a stud 126 which extends at right angles thereto through a slot 128 on the picker finger 104 and terminates in a roller follower 130. The roller follower 130 normally travels on a cam surface outlined on the top of a ring cam 132.

The ring cams 114 and 132 are separated from each other by a spacer ring 134. They are arranged in proper arcuate relationship to give the desired cam timing and are held in this relative vertical position by studs 136. The complete cam assembly fits beneath the transfer table 95 and is held against rotation with respect to the transfer table by holding rods 138 and 140 which are fastened to the base A. A clamping plate 142 extends over the bottom edge of the spacer plate 134 and is bolted to the transfer table 95 in a manner permitting the free rotation of the table without rotation of the ring cams 114 and 132 and the spacer ring 134. The cam followers travel around near the outer periphery of the ring cams and during one portion of the travel of the cam follower 112 it encounters a cut-out portion of the ring cam 114 and actually travels along the bottom surface of the transfer table 95.

Referring to Figs. 17 to 21, the picker finger projection 108 will be above the transfer table 95 when the cam follower 112 is riding under the upward urging of the spring 124 on a high point of travel defined by the bottom surface of the transfer table and the cam follower 130 is riding on the high portion of the ring cam 132 (see Fig. 17). As the table 95 rotates the follower 130 reaches a low point on the ring cam 132 which would cause the detector and the picker finger both to move downwardly except for the fact that the arm 122 contacts the top of a fitment which has been applied to a bottle (see Fig. 18). Thus the picker finger projection 108 remains above the transfer table 95 and is effective to strip the lowermost cap in the chute 20 out of the chute against the force of the plunger 97 and spring 98.

When the arm 122 of the detector 118 fails to contact the top of a fitment as when either no fitment has been placed on a bottle being fed through (see Fig. 19) or where no bottle is being fed through, the detector 118 will move down and permit the picker finger to move down also. With the picker finger in a down position the projection 108 will not be presented above the table 95 and no cap will be stripped from the chute 20.

The cam surfaces as shown in Fig. 21 then provide for a lift portion for cam follower 130 which is effective to raise the detector 118 upwardly clear of any bottle that might be present and disengaged from any bottle which might not have had a fitment thereon. Shortly thereafter the ring cam 114 is effective to lower the picker finger so that the cap will be freed for engagement by a capping chuck 146 of the turret B. The turret B operates in a known manner to intersect the arc of travel of the transfer table and engage the cap traveling thereon.

The mechanisms of the turret B form no part of this invention, but the operation thereof is similar to that disclosed in Patent 2,241,455 to Gantzer, dated May 13, 1941.

The bottles are advanced in the pockets of the star wheel 93 directly below its respective cap being moved along on the transfer table 95. When the bottle is moved through about one-quarter revolution by the star wheel it is positioned in the path of travel of a clamping wheel 148 having four sets of clamping arms 150 one set of which is effective to engage a bottle and hold it while the bottle is rotated beneath the capping turret B. The capping turret then becomes effective in a broken way to engage a cap from the transfer table, hold it until it is moved beyond the table, and then apply it to the bottle over the fitment thereon.

The clamping arms 150 release the bottle at the end of the capping operation and the bottles are then moved by a small two-pocket star wheel 152 back to the conveyor C where they are discharged. The star wheel 152 is also rotated by mechanisms in the base A.

The operation of the machine is as follows: Fitments are dumped into the hopper 10 where they are properly oriented by the mechanism E and fed to the chute 22 and caps are dumped in a hopper mounted over the sorting and feeding mechanism F and fed by the latter to the chute 20. Bottles are advanced by the conveyor C and then moved individually by the star wheel 28 beneath the fitment applying mechanism D. The top of each bottle engages the rim of the lead fitment and drags it out of the chute while causing the detents 86 and 88 to move outwardly against the force of the spring 89. Simultaneously the bottle brings the fiitment below the rollers 67 which are effective under the influence of the spring 56 to press the fitment over the lip 32 as the fitment and bottle move underneath.

Each bottle is then moved into a pocket of the star wheel 93 and moved to the capping turret B. At the same time the cap transfer table is rotating in an arc directly above the star wheel 93. The transfer table 95 and the star wheel 93 are positioned so that each detector 118 is directly over a respective bottle held in a pocket of the star wheel 93. At this point a low portion of the ring cam 132 is traversed by the detector follower 130, permitting the detector 118 with the picker finger 104 to move downwardly. If the arm 122 of the detector 118 contacts a fitment it is held upwardly together with the picker finger 104 so that when the picker finger moves under the chute 20 a cap 96 is stripped out by the projecting portion 108. In the event no bottle is present or a fitment is not present on the bottle in the pocket of the star wheel 93 below the detector, the detector will move downwardly, bringing the picker finger 104 down also, and since the projection 108 is moved below the top of the transfer table 95 no cap is stripped from the chute 20.

When a bottle with a fitment thereon is present it and the cap for it will be moved in the same arc by the star wheel 93 and the transfer table 95. The cam follower 130 will then be moved onto a high lift portion of the ring cam 132 and slightly later the cam follower 112 will engage the lowermost portion of the overhead ring cam 114, the first causing the detector to move upwardly so that the arm 122 will be completely above the normal position of the top of the bottle, and the second causing the projection 108 of the picker finger 104 to move below the top of the table 95 against the action of the spring 124.

The cap is then engaged by a capping chuck from the turret B as the transfer table 95 intersects the arc of operation of the turret B, and since the picker finger has been withdrawn from the top of the transfer table, the chuck can engage a cap and move it off the transfer table 95.

At the same time each bottle is engaged by a set of the clamping arms 150 which holds the bottle firmly as the mechanisms in the capping turret are effective to cause the capping chuck, which has picked up a cap from the transfer table 95, to apply it onto the bottle. Whereupon the bottles are moved by the star wheel 152 past curved guiding means to the discharge part of the conveyor C.

This machine can also be used for the ordinary capping of bottles to which no fitments are to be applied. To adjust the machine for this purpose it is only necessary to rotate the cam 132 relative to the cam 114 by changing the position of the link 140. This will sufficiently advance the timing of the cam 132 that the detecting function of the detector 118 will become inoperative because its rise and fall will occur in the "dead" left quadrant before entering "live" front quadrant where the caps and bottles become juxtaposed. The position of the picker cam 114 is unchanged.

A machine constructed in accordance with this invention provides means for both the placing of fitments onto bottles and the subsequent placing of a screw cap or friction cap thereon. Means are provided to prevent the feeding of a cap to the capping means in the event either no bottle is present or no fitment is on the bottle. Thus the machine provides a positive automatic means for properly seating first a fitment and then a cap onto bottles or containers of the type described herein.

It is, of course, to be understood that various details of arrangements and proportions of parts may be modified within the scope of the appended claims.

I claim:
1. A machine for placing fitments onto containers including, means for continuously advancing a series of containers, a supply chute for said fitments, a pivotally mounted structure defining a fitment exit passage arranged in alignment with said chute and projecting downwardly into the path of said advancing containers, means for biasing said exit passage against upward movement out of the path of said advancing containers, and a pair of detents biased toward each other and being arranged in said fitment exist passage to block the exit thereof and being movable apart to open the eixt of said passage whenever an advancing container engages the lowermost fitment therein to withdraw it from said exit passage, the lower end of said exit passage structure being simultaneously effective to bear downwardly on the fitment to seat it on the top of the container as it moves thereunder.

2. A container fitment applying and capping machine comprising means for continuously advancing a series of containers, a supply chute for said fitments, a pivotally mounted fitment exit passage structure connected to said supply chute, means to releasably hold the lowermost fitment in said exit passage structure with the bottom of the fitment extending outwardly from the bottom edge of said passage into the path of said advancing containers and to permit the withdrawal of a fitment upon contacting a respective container, means to bias said fitment exit passage structure in a direction downwardly over the path of said advancing containers and to press seat each fitment onto the top of each container as it is advanced therebelow, and means for applying a cap onto each container over the fitment thereon.

3. A container fitment applying and capping machine comprising means for continuously advancing a series of containers, means for applying fitments onto each successively advanced container, a continuously rotating capping turret, means for moving said containers from said fitment applying means to said turret and successively presenting them thereto in properly timed relation, a supply chute for caps, resilient means holding said caps in said chute, means successively projectible into the open side of each cap whereby to withdraw a cap from said chute against the withholding force of said resilient means and to move it through a predetermined path, capping means on said turret operable to interest the path of each cap and to engage it and place it onto one of the successively presented containers, and detector means located in the path of said containers and effective when no fitment is present on a container to render said projectible cap withdrawing means inoperative.

4. A container fitment applying and capping machine comprising means for continuously advancing a series of containers, a supply chute for fitments, a pivotally mounted fitment exit passage structure pivotally mounted adjacent said supply chute as a continuation thereof, means to hold the lowermost fitment in said exit passage structure with the bottom of the fitment extending outwardly from the bottom edge of said exit passage into the path of said advancing containers whereby to permit the withdrawal of the fitment upon being contacted by a container, means to bias said fitment exit passage structure in a direction downwardly over the path of said advancing containers whereby the lower end thereof becomes effective to press seat the fitment onto the top of the container as it is advanced therebelow, a continuously rotating capping turret, means for moving said containers from said fitment applying means to said turret and successively presenting them thereto in properly timed relation, a supply chute for caps, resilient means holding said caps in said chute, means projectible into the open side of each cap whereby to withdraw a cap from said chute against the withholding force of said resilient holding means and to move it through a predetermined path, capping means on said turret operable to intersect the path of each cap and to engage it and place it onto a container, and detector means located in the path of said containers and effective when no fitment is present on a container to render said projectible cap withdrawing means inoperative.

5. A container fitment applying and capping machine comprising means for continuously advancing a series of containers, a supply chute for the fitments, a pivotally mounted fitment exit passage structure pivotally mounted adjacent said supply chute as a continuation thereof, means to releasably hold the lowermost fitment in said exit passage with the bottom of the fitment extending outwardly from the bottom edge of said exit passage into the path of said advancing containers and to permit the withdrawal of a fitment upon being contacted by a container, means to bias said fitment exit passage structure in a direction downwardly over the path of said advancing containers whereby its lower end becomes effective to press seat each fitment onto the top of the container being advanced therebelow, a continuously rotating capping turret, a continuously rotating cap transfer table, a continuously rotating star wheel having a plurality of container engaging pockets thereon arranged to rotate below said transfer table and being effective to engage each container and move it into operative association with said capping turret, a cap supply chute mounted over said transfer table, means for holding the caps in said chute with the open end of the lowermost cap projecting over the transfer table, a picker finger pivotally affixed to said transfer table and normally projecting above said transfer table sufficiently to engage a cap and withdraw it from said chute against the the action of said holding means for transfer to said capping turret, said picker finger being movable below said transfer table, a detector connected to said picker finger for contact with the top of a fitment present on a container to maintain the picker finger in a position projecting above the top of said transfer table and being movable with said picker finger downwardly below the top of said transfer table when no fitment is contacted by said detector to prevent the withdrawal of a cap from the cap supply chute, means for moving each said container from said star wheel into operative engagement with said turret, and means on said turret for removing a cap from said transfer table and applying it to a container.

6. A container fitment applying and capping machine comprising means for continuously advancing a series of containers, means for applying a fitment onto each said container, means subsequently effective for applying a cap onto each said container over the fitment, said fitment applying means being operative solely in response to continuous movement of said containers by said advancing means, and means for preventing said subsequently effective means for applying a cap to a container that does not have a fitment thereon.

References Cited in the file of this patent

UNITED STATES PATENTS

| | | |
|---|---|---|
| 2,036,105 | Strout | Mar. 31, 1936 |
| 2,047,846 | Wright et al. | July 14, 1936 |
| 2,765,606 | Brown | Oct. 9, 1956 |
| 2,835,963 | Drennan et al. | May 27, 1958 |

FOREIGN PATENTS

| | | |
|---|---|---|
| 456,954 | Canada | May 24, 1949 |